Oct. 11, 1927.
L. LAVEN
1,645,433
VEHICLE TOP CONSTRUCTION
Filed Nov. 19, 1926
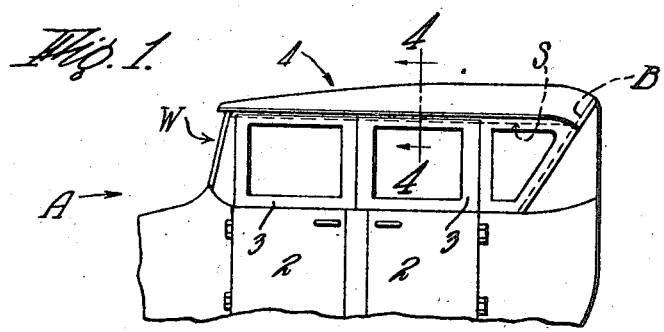
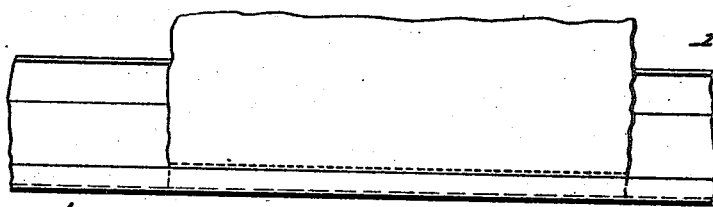
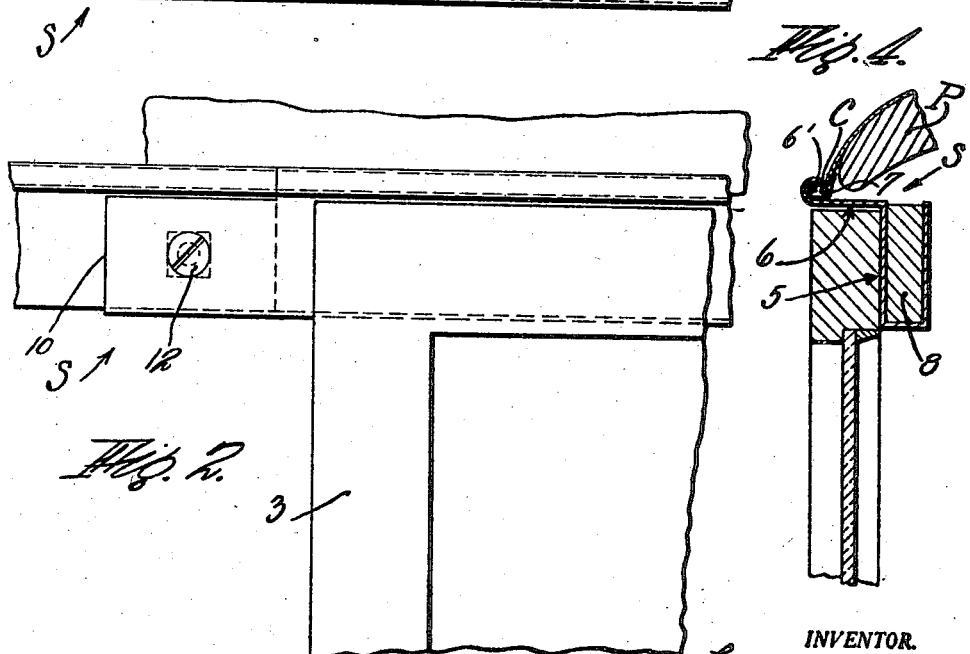
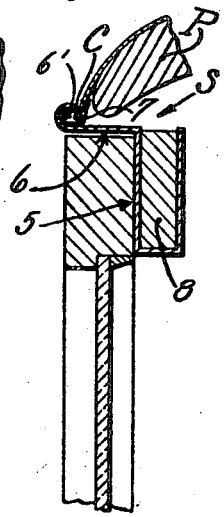
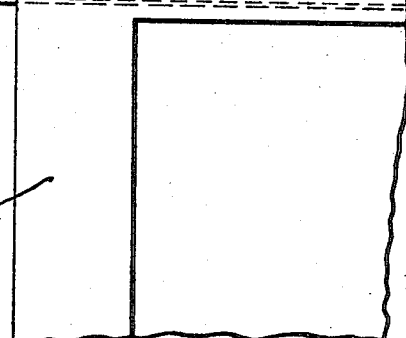
INVENTOR.
Louis Laven
BY Chapin & Neal
ATTORNEYS.

Patented Oct. 11, 1927.

1,645,433

UNITED STATES PATENT OFFICE.

LOUIS LAVEN, OF SPRINGFIELD, MASSACHUSETTS, ASSIGNOR TO HAMPDEN AUTO TOP & METAL COMPANY, OF SPRINGFIELD, MASSACHUSETTS, A COPARTNERSHIP CONSISTING OF LOUIS LAVEN, MYERS SCHWARTZ, AND MAX SCHAFFER.

VEHICLE-TOP CONSTRUCTION.

Application filed November 19, 1926. Serial No. 149,368.

This invention relates to improvements in vehicle top construction and is directed particularly to improvements in bumper strips for automobiles or the like.

In converting an automobile of the open type which has a folding top into one of the closed type, it is usual, in order to provide a rigid top structure, to replace the longitudinal hinged or top supporting members at the sides of the top with rigid or non-hinged longitudinal supports commonly termed "bumper strips". These are ordinarily suitably connected at their forward ends to the wind shield posts and at their rear ends to the rear top supporting bow. They not only function as rigid suports for the top covering material at the side edges thereof but also act as a stop or an abutting rail against which the upper edge of the window strikes or abuts when the door is closed. Ordinarily the side edges of the top covering material is wrapped around these bumper strips and is stitched in such a manner as to completely enclose the same.

This prior structure offers disadvantages and is objectionable for many reasons. Principally, when the window is closed it bears against the top covering fabric which is wrapped around the bumper strip so that any relative movement between the window and strip, which is present to some extent whenever the vehicle is in motion, produces a rubbing or chaffing action so that the top material is soon worn through so that it soon becomes loosened from the strip. Further, there are usually spaces between the windows and strip through which rain may seep as it runs off at the sides of the top.

One object of my invention is the provision of a bumper strip for the purpose described which overcomes the above objections and is accomplished by providing a strip of novel form having a shelf portion for receiving and holding the side edges of the top covering which is removed from the stop portion and is so disposed and arranged as to form a watershed over the jointure of the upper edge of the window and the stop portion of the strip. With the structure to be described it will be apparent that the window does not contact with the top covering material at all to cause a wearing of the same while the jointure of the window and strip is protected against leakage by an overlying shelf portion of the bumper strip.

Other novel features will be observed from the following description of the invention which is shown in the form at present preferred by means of the accompanying drawings in which:

Fig. 1 is a side elevational view of a portion of an automobile and showing a structure incorporating the novel features of my invention;

Fig. 2 is a side elevational view at a larger scale of a portion of the bumper strip and showing a portion of the upper edge of a window in abutment therewith;

Fig. 3 is a plan view of a portion of the top at one side edge thereof; and

Fig. 4 is an enlarged sectional elevational view taken on the line 4—4 of Fig. 1.

The novelty of invention is applicable to broad application but will be described in connection with an automobile the upper portion of which is represented by A and which has swinging doors 2, each carrying windows 3 arranged to open and close therewith. A top is represented at 4 and as usual may comprise the ordinary fabric covering material which extends from the windshield W rearwardly to a point where it is suitably connected to and supported by the rear bow B in the usual manner.

The bumper strip S of my invention extends longitudinally of the top at either side thereof and may be secured at its ends to convenient support such as the windshield posts at the forward end and the rear bow B at the rear end.

Any means desired for fastening the strip may be employed to securely anchor and rigidly hold the strip in place and does not necessarily form a part of this invention as various vehicles will require various forms of securing means.

The bumper strip S, which may be of sheet metal, is preferably formed, as best shown in Figs. 2, 3 and 4, to have an abutment or stop 5 for the window to strike against and an overhanging watershed or shelf 6 thereabove which is curled inwardly to provide a slot or groove 6' for receiving the edge 7 of the top covering material. The abutment or stop portion may be extended to the rear of the stop if desired so as to embrace a reinforcing or stiffening member 8 which may be of any required or desired cross sectional area or shape so as to be adapted to stiffen or reinforce the bumper strip structure.

The edges of the top covering fabric may be arranged in various ways to fit snugly within the groove 6 but the particular form shown is found to be perfectly satisfactory for practical purposes. In the form shown, the edge of the material is wrapped around a flexible or resilient cord C or the like and is sewed as shown so as to enclose and securely embrace the cord whereby the edge becomes reinforced and shaped to fit within the slot or groove.

With the bumper strips in place and suitably secured to the automobile, the side edges of the top covering material are inserted in the slots 6' of the strips whereby the material is securely held in place and is thereby drawn taut over the cross bows and longitudinal padding strips P, usually employed as a support along the sides of the top.

As will be seen by reference to Fig. 4, the watershed of the strip extends over the top of the window so as to overlie and protect or seal the joint between the stop and the window abutting thereagainst. Also it will be noted that the window does not contact with the top covering material whereby the chaffing or rubbing of the material as previously referred to is eliminated.

To facilitate the convenient packing of the improved bumper strip for shipment, it may be made in sections and I have shown in Fig. 2 a joint for connecting the sections which comprises an overlapping section extension 10 of the stop which is secured to an adjacent strip by a coupling bolt 12. By providing the joints, it is possible to manufacture the strip in comparatively short lengths or in fact in any desired lengths whereby they may be easily packed for shipment and when secured together as shown the sections form a stiff, rigid, unitary structure.

I am aware that many changes may be made in the form of the invention without departing from the scope thereof, and I prefer therefore to be limited by the appended claims rather than by the foregoing description.

What I claim is:

1. In combination, a vehicle body, a top covering supported at opposite ends by said body, a bumper strip supported at its opposite ends by said body and disposed below the side edge of said top, the said strip having a vertical wall and a horizontal wall integral therewith which is bent to form a slot having a restricted opening at the upper side thereof for receiving the marginal edge of said top and the said side edge of the top being doubled upon itself about a cord to provide an enlarged selvage for insertion in said slot.

2. In combination, a vehicle body, a top covering supported at opposite ends by said body and having its opposite marginal side edges folded about a flexible member and secured in overlapping relation to the body portion of said top to provide reinforced thickened side edges, bumper strips disposed at the sides of said top and supported at opposite ends by said body, each comprising longitudinal vertical side walls and horizontal walls integral therewith which extend outwardly therefrom and that are bent upwardly and inwardly to provide longitudinal slots having restricted lateral openings, all adapted and arranged whereby the reinforced edges of said top are embraced by said strips and held from lateral displacement thereby.

In testimony whereof I have affixed my signature.

LOUIS LAVEN.